United States Patent
Roberts

(10) Patent No.: US 9,102,086 B2
(45) Date of Patent: Aug. 11, 2015

(54) IN-SITU FOAM CORE STRUCTURAL ARTICLES AND METHODS OF MANUFACTURE OF PROFILES

(76) Inventor: Richard W. Roberts, Tecumseh, MI (US)

( * ) Notice: Subject to any disclaimer, the term of this patent is extended or adjusted under 35 U.S.C. 154(b) by 78 days.

(21) Appl. No.: 13/463,689

(22) Filed: May 3, 2012

(65) Prior Publication Data

US 2013/0260063 A1  Oct. 3, 2013

Related U.S. Application Data

(60) Provisional application No. 61/616,817, filed on Mar. 28, 2012.

(51) Int. Cl.
*B29C 44/20* (2006.01)
*B32B 1/08* (2006.01)
*B29C 44/32* (2006.01)

(52) U.S. Cl.
CPC .............. *B29C 44/206* (2013.01); *B29C 44/32* (2013.01); *B32B 1/08* (2013.01); *Y10T 428/13* (2015.01)

(58) Field of Classification Search
CPC ............ B32B 5/18; B29C 49/04; B62B 15/00
USPC ....................................................... 264/45.4
See application file for complete search history.

(56) References Cited

U.S. PATENT DOCUMENTS

| | | | |
|---|---|---|---|
| 776,342 A | 11/1904 | McCormick | |
| 1,588,778 A | 6/1926 | Sorensen | |
| 2,983,963 A | 5/1961 | Jodell et al. | |
| 3,062,337 A | 11/1962 | Zittle | |
| 3,111,787 A | 11/1963 | Chamberlain | |
| 3,132,417 A | 5/1964 | Irwin | |
| 3,277,220 A | 10/1966 | Plymale et al. | |
| 3,389,195 A | 6/1968 | Gianakos et al. | |
| 3,400,429 A | 9/1968 | Ludwig | |
| 3,466,700 A | 9/1969 | Harrison | |
| 3,468,097 A | 9/1969 | Mack | |
| 3,563,845 A | 2/1971 | Stevens | |

(Continued)

FOREIGN PATENT DOCUMENTS

| EP | 0542302 | 5/1993 |
|---|---|---|
| JP | 58213028 | 12/1983 |

(Continued)

OTHER PUBLICATIONS

Website www.jsp.com, 2006, "Arplank, Expanded bead foam packaging materials, Material Properties, Auto/Mil Specs." 21 Pages.

(Continued)

*Primary Examiner* — Larry Thrower
(74) *Attorney, Agent, or Firm* — Brooks Kushman P.C.

(57) ABSTRACT

A method of manufacturing an elongated article is recited to include extruding a first and a second layer each having peripheries. The second layer is spaced apart from and opposed to the first layer. Together, they define a cavity between them. Into that cavity particles are dispensed. The particles are expanded with an expansion fluid to form an in-situ foam core and to thermally bond the in-situ foam core to the first and second layers. The first and second layers having the thermal bond to the in-situ foam core are shaped to form the article. An elongated article from this process is also recited.

14 Claims, 3 Drawing Sheets

(56) References Cited

U.S. PATENT DOCUMENTS

| | | |
|---|---|---|
| 3,598,312 A | 8/1971 | Hamilton |
| 3,745,998 A | 7/1973 | Rose |
| 3,813,040 A | 5/1974 | Heinemeyer |
| 3,935,044 A | 1/1976 | Daly |
| 4,361,656 A | 11/1982 | Mostafa |
| 4,492,663 A | 1/1985 | Reinfeld et al. |
| 4,546,899 A | 10/1985 | Williams |
| 4,651,494 A | 3/1987 | Van Wagoner |
| 4,680,909 A | 7/1987 | Stewart |
| 4,825,089 A | 4/1989 | Lindsay |
| 4,840,973 A | 6/1989 | Kuwabara et al. |
| 5,018,329 A | 5/1991 | Hasan et al. |
| 5,028,377 A | 7/1991 | Hendry |
| 5,055,350 A | 10/1991 | Neefe |
| 5,093,053 A | 3/1992 | Eckardt et al. |
| 5,252,270 A | 10/1993 | Haardt et al. |
| 5,306,266 A | 4/1994 | Freeland |
| 5,345,814 A | 9/1994 | Cur et al. |
| 5,366,674 A | 11/1994 | Hattori et al. |
| 5,505,810 A | 4/1996 | Kirby et al. |
| 5,532,034 A | 7/1996 | Kirby et al. |
| 5,665,285 A * | 9/1997 | Hattori et al. ............... 264/45.4 |
| 5,711,073 A | 1/1998 | Tippmann et al. |
| 5,713,518 A | 2/1998 | Fox et al. |
| 5,759,459 A | 6/1998 | Eckardt et al. |
| 5,786,394 A | 7/1998 | Slaven |
| 5,824,261 A | 10/1998 | Berdan |
| 5,866,224 A | 2/1999 | Ang et al. |
| 5,956,905 A | 9/1999 | Weidrich |
| 6,179,215 B1 | 1/2001 | Shea |
| 6,196,760 B1 | 3/2001 | Sinclair |
| 6,230,981 B1 | 5/2001 | Hill et al. |
| 6,241,926 B1 | 6/2001 | Cutler |
| 6,375,892 B2 | 4/2002 | Thomas |
| 6,605,343 B1 | 8/2003 | Motoi et al. |
| 6,685,333 B1 | 2/2004 | Bieberdorf |
| 6,692,183 B2 | 2/2004 | Godfrey |
| 6,931,809 B1 | 8/2005 | Brown et al. |
| 6,938,968 B2 | 9/2005 | Tanimoto et al. |
| 6,972,144 B2 | 12/2005 | Roth et al. |
| 7,219,479 B2 | 5/2007 | Durning et al. |
| 7,358,280 B2 | 4/2008 | Berghmans et al. |
| 7,401,998 B2 | 7/2008 | Wilson et al. |
| 7,485,352 B2 | 2/2009 | Yuasa et al. |
| 7,537,413 B1 | 5/2009 | Brugos |
| 7,931,210 B1 | 4/2011 | Pike et al. |
| 7,950,592 B2 | 5/2011 | Yuan |
| 2002/0124531 A1 | 9/2002 | Mossbeck et al. |
| 2003/0081999 A1 | 5/2003 | Godfrey |
| 2003/0181536 A1 | 9/2003 | Roth |
| 2003/0224675 A1 | 12/2003 | Yeh |
| 2004/0172964 A1 | 9/2004 | Brachert et al. |
| 2004/0176001 A1 | 9/2004 | Yeh |
| 2004/0232254 A1 | 11/2004 | Kowalski |
| 2005/0001048 A1 | 1/2005 | Skoblenick et al. |
| 2005/0101201 A1 | 5/2005 | Yeh |
| 2005/0188637 A1 | 9/2005 | Yeh |
| 2005/0215138 A1 | 9/2005 | Yeh |
| 2005/0272323 A1 | 12/2005 | Yeh |
| 2006/0030467 A1 | 2/2006 | Mellott |
| 2006/0078382 A1 | 4/2006 | Wilson et al. |
| 2006/0105650 A1 | 5/2006 | Yeh |
| 2006/0110993 A1 | 5/2006 | Yeh |
| 2006/0131437 A1 | 6/2006 | Thiagarajan et al. |
| 2006/0134401 A1 | 6/2006 | Yeh |
| 2006/0223897 A1 | 10/2006 | Sasaki |
| 2007/0015421 A1 | 1/2007 | Yeh |
| 2007/0040293 A1 | 2/2007 | Lane et al. |
| 2007/0160798 A1 | 7/2007 | Yeh |
| 2008/0081153 A1 | 4/2008 | Yeh |
| 2008/0083835 A1 | 4/2008 | Girardi et al. |
| 2008/0125502 A1 | 5/2008 | Reichman et al. |
| 2008/0142611 A1 | 6/2008 | Scobie |
| 2008/0166539 A1 | 7/2008 | Yeh |
| 2008/0242169 A1 | 10/2008 | Yeh |
| 2008/0305304 A1 | 12/2008 | Yeh |
| 2009/0100780 A1 | 4/2009 | Mathis et al. |
| 2010/0028654 A1 | 2/2010 | Takase et al. |
| 2010/0116180 A1 | 5/2010 | Roth et al. |
| 2012/0031912 A1 | 2/2012 | Wang |
| 2012/0102884 A1 | 5/2012 | Roberts, Jr. |
| 2012/0104110 A1 | 5/2012 | Roberts, Jr. |
| 2012/0328889 A1 | 12/2012 | Hayashi et al. |

FOREIGN PATENT DOCUMENTS

| | | |
|---|---|---|
| JP | 59155443 | 9/1984 |
| JP | 59210954 | 11/1984 |
| JP | 60090744 | 5/1985 |
| JP | 06166112 | 6/1994 |
| JP | 07195536 | 8/1995 |
| WO | 9119867 | 12/1991 |
| WO | 2011103284 | 8/2011 |

OTHER PUBLICATIONS

Website, Manning, www.mmh.com Oct. 2008, Retrieved on Jan. 4, 2011, "Modern Materials Handling, Choosing Plastic." 2 Pages.

Website, Specter, www.mmh.com Sep. 2009, "Modern Materials Handling, The Rise of the Plastic Pallet." 4 Pages.

* cited by examiner

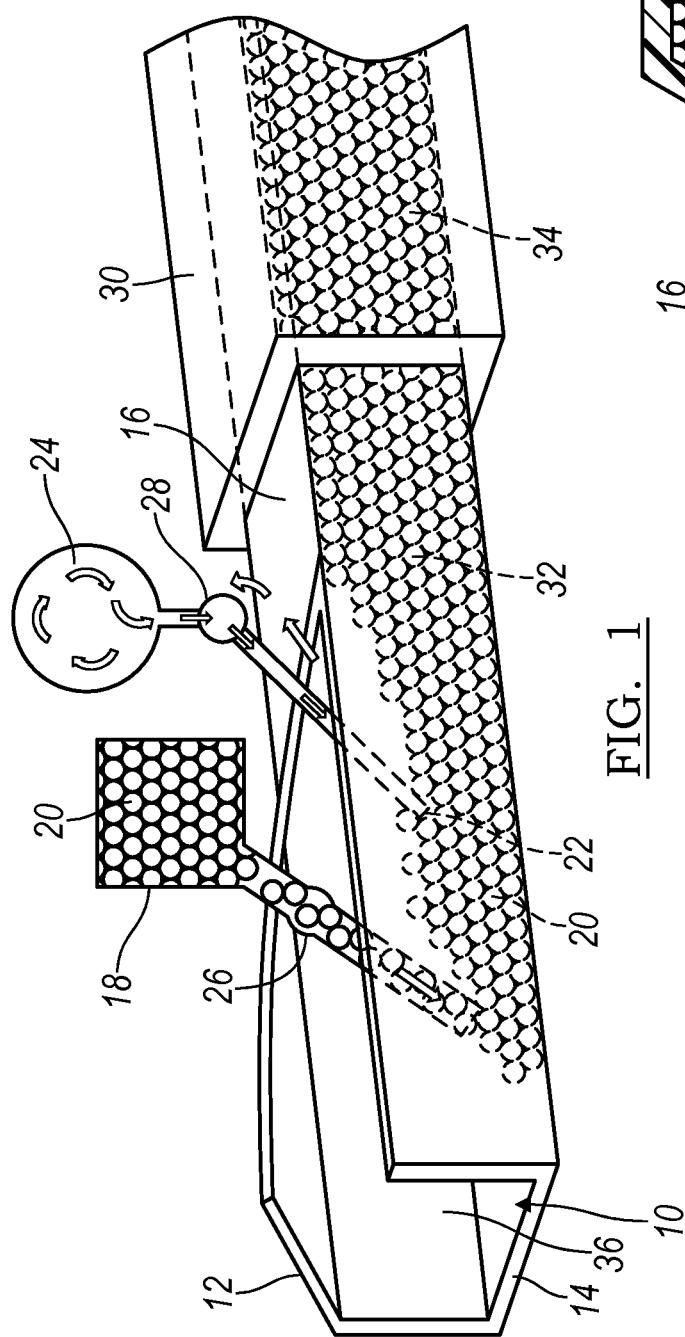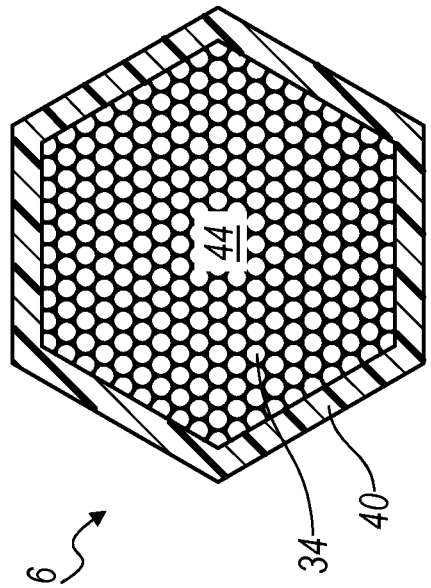
FIG. 1
FIG. 2

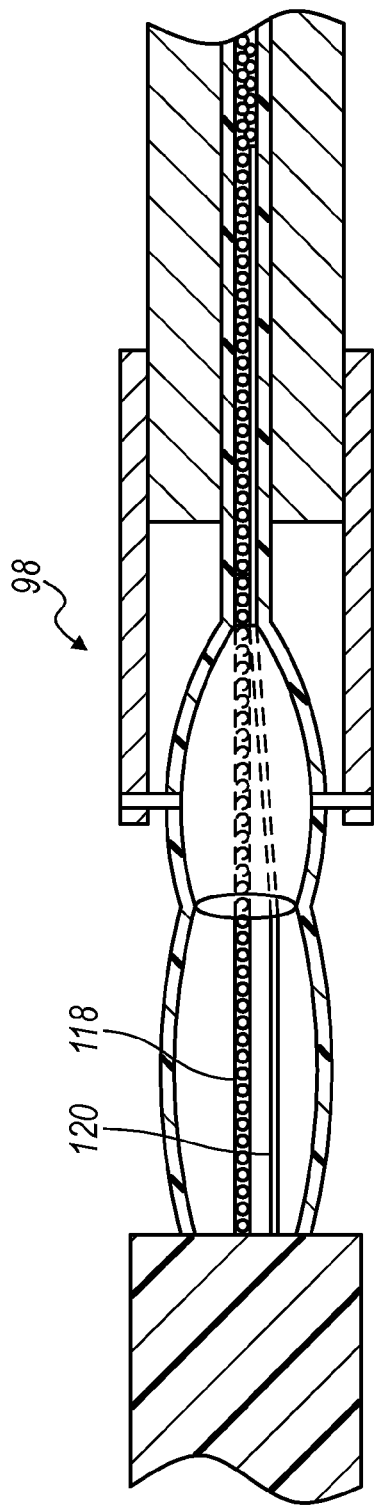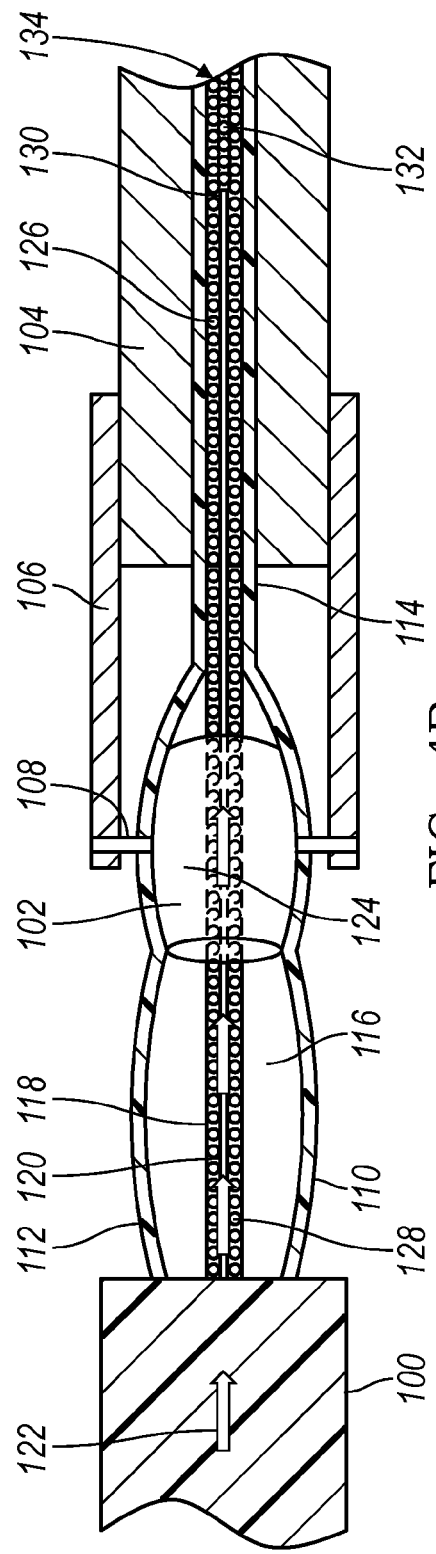
FIG. 4A
FIG. 4B

IN-SITU FOAM CORE STRUCTURAL ARTICLES AND METHODS OF MANUFACTURE OF PROFILES

CROSS-REFERENCE TO RELATED APPLICATIONS

This application claims the benefit of U.S. provisional Application No. 61/616,817 filed Mar. 28, 2012, the disclosure of which is incorporated in its entirety by reference herein.

TECHNICAL FIELD

The disclosed embodiments relate to in-situ foam core structural articles and methods of manufacture of profiles.

BACKGROUND

Plastic processors who use profile extrusion methods continue to reduce the amount of plastic material used in every part made in order to reduce the cost of materials as well as increased the line speed of the extrusion equipment. Often, reducing the amount of material used results in weaker structural properties for the finished article.

Profile extruders, even those initially producing sheet extrusions, can create an article having an internal cavity in the article during the extrusion process. When the article has the internal cavity, plastic processors will often improve the structural properties of the finished article by adding a microcellular foam to the cavity using either a chemical or physical blowing agent to expand the foam.

Certain processes that create articles that, at least partially, fill the cavity extend the time periods for foaming and slow the line speed, which is not economically justified in view of the costly machine time. But, microcellular foaming does guarantee structural strength for profiles. Unless the profile wall uses a relatively thick, foam-filled, extruded plastic, the profile article will not be structural. In addition, in certain processes, the plastic material of the profile extruded article is different from the plastic material used for the foam core, rendering the article difficult to recycle. Recycling of articles after completion of their useful life is increasingly desirable for sustainability objectives as well as being included in certain regulations and specifications.

SUMMARY

In at least one embodiment, an elongated article is recited having an elongated profile. The elongated profile includes a first layer having a periphery and a spaced apart and opposed second layer having a periphery. The first and second layers define a cavity therebetween. Within the cavity, an in-situ foam core is disposed. The in-situ foam core has a thermal bond to first and second layers. The first or second layer thickness ranges from 0.03 inches to 0.5 inches. The in-situ foam core density ranges from 1 lb/ft$^3$ to 25 lbs/ft$^3$.

In another embodiment, a method of manufacturing an elongated article is recited to include extruding a first and a second layer each having peripheries. The second layer is spaced apart from and opposed to the first layer. Together, they define a cavity between them. Into that cavity particles are dispensed. The particles are expanded with an expansion fluid to form an in-situ foam core and to thermally bond the in-situ foam core to the first and second layers. The first and second layers having the thermal bond to the in-situ foam core are shaped to form the article.

In yet another embodiment, a method of manufacturing an elongated article is recited to include extruding a first elongated molten plastic arm having longitudinal axis and a second elongated molten plastic arm having a longitudinal axis. The first and second elongated molten arms are passed about a spider to form a profile defining a cavity. A plurality of particles is introduced into the cavity through a dispenser disposed co-linearly with at least one longitudinal axis. The profile is disposed into a mold having a downstream end. An expansion fluid is injected into the particles to expand the particles to form an in-situ foam core and thermally bond the in-situ foam core to the profile forming the elongated article. The first and second molten plastic arms when passing about the spider experience an average pressure drop from the spider maximum width to the downstream end that is constant within a range of +10 rel. % to −10 rel. % relative to the average pressure drop.

BRIEF DESCRIPTION OF THE DRAWINGS

FIG. 1 schematically illustrates a method of producing a structural article having an in-situ foam core according to at least one embodiment;

FIG. 2 schematically illustrates a structural hollow profile having in-situ foam core according to at least one embodiment;

FIG. 4A-B schematically illustrates a method producing a plastic article according to another embodiment.

DETAILED DESCRIPTION

Figure 3A:
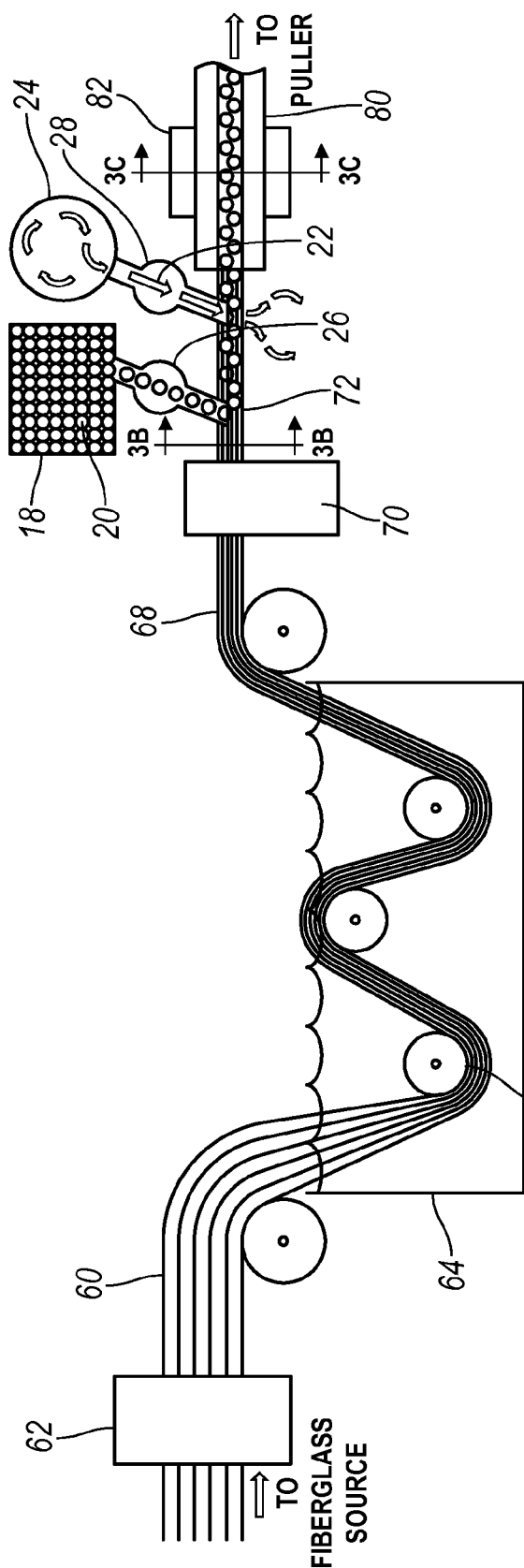
FIG. 3A-C schematically illustrates a method producing a plastic structural article according to at least one embodiment.

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Except where expressly indicated, all numerical quantities in the description and claims, indicated amounts of material or conditions of reaction and/or use are to be understood as modified by the word "about" in describing the broadest scope of the present invention. Practice within the numerical limits stated should be desired and independently embodied. Ranges of numerical limits may be independently selected from data provided in the tables and description. The description of the group or class of materials as suitable for the purpose in connection with the present invention implies that the mixtures of any two or more of the members of the group or classes are suitable. The description of constituents in chemical terms refers to the constituents at the time of addition to any combination specified in the description and does not necessarily preclude chemical interaction among constituents of the mixture once mixed. The first definition of an acronym or other abbreviation applies to all subsequent uses herein of the same abbreviation and applies mutatis mutandis to normal grammatical variations of the initially defined abbreviation. Unless expressly stated to the contrary, measurement of a property is determined by the same techniques previously or later referenced for the same property. Also, unless expressly stated to the contrary, percentage, "parts of,"

and ratio values are by weight, and the term "polymer" includes "oligomer," "co-polymer," "terpolymer," "pre-polymer," and the like.

It is also to be understood that the invention is not limited to specific embodiments and methods described below, as specific composite components and/or conditions to make, of course, vary. Furthermore, the terminology used herein is used only for the purpose of describing particular embodiments of the present invention and is not intended to be limiting in any way.

It must also be noted that, as used in the specification and the pending claims, the singular form "a," "an," and "the," comprise plural reference unless the context clearly indicates otherwise. For example, the reference to a component in the singular is intended to comprise a plurality of components.

Throughout this application, where publications are referenced, the disclosure of these publications in their entirety are hereby incorporated by reference into this application to more fully describe the state-of-art to which the invention pertains.

FIG. 1 schematically illustrates a method of producing a plastic structural article having an in-situ foam core according to at least one embodiment. An open-sided plastic extrusion profile 10 provided by a profile or sheet die extrusion (not shown) is schematically illustrated where a top portion 12 of the extrusion profile 10 is hingedly connected to fold over channel portion 14 when urged by shaping fingers (not shown) or other means known in the art to form a closed profile 16 while being pulled by a puller (not shown) under tension through a shaping and cooling line (not shown).

During a time period when top 12 is open and not connected at both ends to channel 14, a plurality of particles, such as pre-expanded beads 20, are provided to channel 14 from a bead dispenser 18. As the profile continues to move downstream from the profile extrusion die, an expansion fluid, such as steam 22 is provided from a steam source 24 into the pre-expanded beads 20. Both the bead dispenser 18 and steam source 24 have valves 26 and 28, respectively, to open and close bead dispenser 18 and steam source 24 controlling the flow of pre-expanded beads 20 and steam 22. Steam 22 is vented prior to a time period when the profile forms a closed profile 16.

Closed profile 16 having rapidly expanding beads 32 as a result of the steam 22 causing the pre-expanded beads 20 to expand completely to their full expansion, enters a shaping fixture 30. Shaping fixture 30 is sufficiently strong to contain expansion pressure of rapidly expanding beads 32 when forming an in-situ foam core 34. In-situ foam core 34 has a thermal bond 42 to a wall 40 (FIG. 2) of closed profile 16. Thermal bond 42, in at least one embodiment, includes a portion of wall 40 a portion of in-situ foam core 34, and a co-mingled layer having both wall 40 and in-situ foam core 34.

In at least one embodiment, steam 22 injection has a frequency ranging from 2 inches of channel portion 14 longitudinal travel to 6 inches of channel portion 14 longitudinal travel. In another embodiment, steam 22 injection has a frequency ranging from 3 inches to 5 inches of channel portion 14 travel.

It should be understood that a lubricant, such as a non-compressible-fluid, such as water, may be used to facilitate the transition of the closed profile 16 into shaping fixture 30. Other fluids, including air and water, may be used to control the temperature of the open-sided plastic profile 10 prior to closed profile 16 having in-situ foam core 34. A vacuum calibrator (not shown) may also be used to define the profile in shaping fixture 30.

Is also understood that while the single bead dispenser 18 is illustrated, certain embodiments may have a plurality of bead dispensers, and each bead dispenser may have pre-expanded beads 20 of identical or differing average diameters. It is further understood that while one steam source 24 is illustrated, certain embodiments may have a plurality of steam sources or multiple apertures along the steam source 24 shaft. In at least one embodiment steam sources 24 are spaced apart by a distance ranging from 2 inches to 6 inches: In another embodiment, steam sources 24 are spaced apart by a distance ranging from 3 inches to 5 inches. In another embodiment, steam sources 24 are spaced apart by a distance ranging from 3 inches to 5 inches of channel portion 14 travel.

The steps of expanding the pre-expanded beads 20 are illustrated by U.S. patent application Ser. Nos. 13/358,181, 13/005,190, and 12/913,132 all of which are incorporated herein by reference.

Turning now to FIG. 2, closed profile 16 having in-situ foam core 34 is schematically illustrated according to at least one embodiment. Closed profile 16 is formed using at least one of extrusion methods including profile, sheet, blown film extrusion, pulltrusion, and metal matrix composite extrusion. Wall 40 of closed profile 16 defines a cavity 44 into which a single density of pre-expanded beads 20 is expanded to form in-situ foam core 34. Closed profile 16 having in-situ foam core 34 forms a structural article. In at least one embodiment, wall 40 comprises a plastic polymer composition when combined with in-situ foam core 34 forms a structural plastic article. In at least one embodiment, the structural plastic article is suitable for forming a structural assembly. It is understood that while a hexagonal-shaped structural article is illustrated in FIG. 2, any suitable shape having a cavity may be used without exceeding the scope or spirit of embodiments. Non-limiting examples of suitable shapes include an I-beam and a pipe.

In at least one embodiment, wall 40 has a polymeric composition that is identical to the polymeric composition of in-situ foam core 34, advantageously rendering the structural plastic article recyclable. A non-limiting example of such a recyclable structural plastic article includes one having wall 40 comprised of polyethylene and in-situ foam core 34 comprised of expanded polyethylene beads. In another embodiment, wall 40 has a polymeric composition that is sufficiently similar to the polymeric composition of in-situ foam core 34 to render still the structural article as recyclable. A non-limiting example of such a recyclable article having similar compositions between the wall 40 and the in-situ foam core 34 include having the wall 40 comprising acrylonitrile butadiene styrene (ABS) and in-situ foam core 34 comprising expanded polystyrene.

In at least one embodiment, wall 40 thickness may range from 0.03 inches to 0.5 inches. In another embodiment, the thickness of wall 40 may range from 0.5 inches to 0.25 inches.

In at least one embodiment, in-situ foam core 34 thickness may range from 0.15 inches to 6 inches. In another embodiment, in-situ foam core 34 thickness may range from 0.2 inches to 4 inches. In another embodiment, in-situ foam core 34 thickness may range from 0.5 inches to 1 inch.

Closed profile 16, in at least one embodiment, is formed of a composition of any extrudable-moldable composition. Non-limiting examples of the extrudable composition include, but is not limited to, a liquid silicone rubber, a synthetic rubber, a natural rubber, a liquid crystal polymer, a synthetic polymer resin, and a natural polymer resin. In another embodiment, closed profile 16 article is formed of a composition of a thermoplastic polymer, a thermoset polymer, or blends thereof having a viscosity ranging from 0.1 grams/10 min to 10 grams/10 min intended for use with profile extrusion. The viscosity is measured according to ASTM D-1238 at 190° C. with a 2.16 kg weight. In yet another embodiment, closed profile 16 article is formed of a composition of a polyolefin including polypropylene and polyethylene having a viscosity ranging from 1 grams/10 min to 8 grams/10 min.

In at least one embodiment, the extrudable composition durometer may range from 35 Shore A to 80 Shore D when measured according to ASTM D 2240. In another embodiment, the extrudable composition durometer may range from 40 Shore A to 70 Shore D.

In-situ foam core 34, in at least one embodiment, is formed of a composition of any fluid-expandable material. Examples of fluid-expandable material include, but are not limited to, a polyolefin polymer composition, a biopolymer composition expandable bead, an alkenyl aromatic polymer or copolymer composition, a vinyl aromatic polymer resin composition, and a polystyrene polymer composition. In at least one embodiment, the polyolefin polymer composition includes polyolefin homopolymers; such as low-density; medium-density; and high-density polyethylenes; isotactic polypropylene; and polybutylene-1, and copolymers of ethylene or polypropylene with other polymerizable monomers such as ethylene-propylene copolymer, ethylene-vinyl acetate copolymer, ethylene-acrylic acid copolymer, and ethylene-ethyl acrylate copolymer, and ethylene-vinyl chloride copolymer. These polyolefin resins may be used alone or in combination. Preferably, expanded polyethylene (EPE) particles, cross-linked expanded polyethylene (xEPE) particles, polyphenyloxide (PPO) particles, biomaterial particles, such as polylactic acid (PLA), and polystyrene particles are used. In at least one embodiment, the polyolefin polymer is a homopolymer providing increased strength relative to a copolymer. It is also understood that some of the particles may be unexpanded, also known as pre-puff, partially, and/or wholly pre-expanded without exceeding the scope or spirit of the contemplated embodiments.

Pre-expanded bead 20, in at least one embodiment, is the resultant bead after the first expansion step of raw bead of a two-step expansion process for beads. During the first expansion step, raw bead is expanded to 2% to 95% of the fully expanded bead size. The fully expanded bead is the bead that forms in-situ foam core 34. In another embodiment, pre-expanded bead 20 is result of the first expansion step where raw bead is expanded from 25% to 90% of the fully expanded bead size.

A fluid for the second expansion step of the two-step expansion process for beads causes the pre-expanded beads to expand completely to form the fully expanded beads. An example of the fluid includes, but is not limited to, steam, Polyolefin beads and methods of manufacture of pre-expanded polyolefin beads suitable for making the illustrated embodiments are described in Japanese patents JP60090744, JP59210954, JP59155443, JP58213028, and U.S. Pat. No. 4,840,973 all of which are incorporated herein by reference. Non-limiting examples of expanded polyolefins are ARPLANK® and ARPRO® available from JSP, Inc. (Madison Heights, Mich.). The expanded polypropylene, such as the JSP ARPRO™ EPP, has no external wall such as wall 40.

In at least one embodiment, in-situ foam core 34 density, after expansion by steam such a such as in FIG. 1, ranges from 0.21 lb/ft$^3$ to 25 lbs/ft$^3$. In at least one embodiment, in-situ foam core 34 density, after expansion by steam such as in FIG. 1, ranges from 1.5 lbs/ft$^3$ to 15 lbs/ft$^3$. In at least one embodiment, in-situ foam core 68 density, after expansion by steam such as in FIG. 1, ranges from 2 lbs/ft$^3$ to 9 lbs/ft$^3$. In at least one embodiment, in-situ foam core 68 density, after expansion by steam such as in FIG. 1, ranges from 3 lbs/ft$^3$ to 6 lbs/ft$^3$.

Preferably, in at least one embodiment, steam-injected expanded polypropylene (EPP) has a density ranging from 0.2 lb/ft$^3$ to 20 lbs/ft$^3$. In yet another embodiment, steam-injected EPP may have a density ranging from 1 lbs/ft$^3$ to 10 lbs/ft$^3$. In yet another embodiment, steam-injected EPP may have a density ranging from 2 lbs/ft$^3$ to 8 lbs/ft$^3$. In yet another embodiment, steam injected EPP may have a density ranging from 3 lbs/ft$^3$ to 6 lbs/ft$^3$.

Figure 3C:
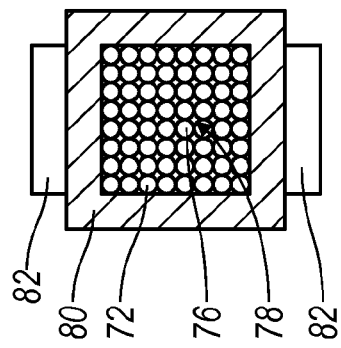
Figure 3B:
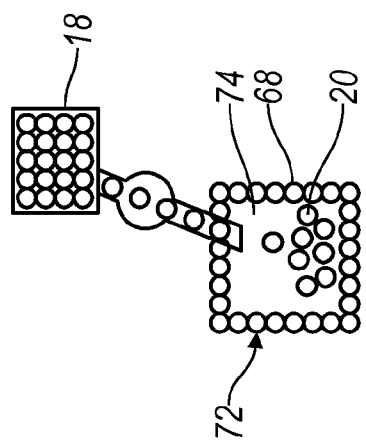

In at least one embodiment, the structural article may be formed using an pultrusion process as schematically illustrated in FIGS. 3A-3C. In this process, a plurality of fiberglass rovings 60 having a longitudinal axis, such as a roving doff, and a transverse axis, such as a mat creel (not shown), pass through an alignment guide 62 and enter a resin bath 64 having a curable resin, and are wetted while passing over a plurality of rollers 66. The wetted fiberglass roving 68 passes through a die 70. While consolidating, a closing profile 72 is formed as fiberglass rovings 60 exit die 70 forming a cavity 74. Pre-expanded beads 20 are placed into the closing profile 72 from a bead dispenser 18. Steam 22 from steam source 24 passes through valve 28 and is injected into pre-expanded beads 20 causing them to form fully-expanded beads 76. The fully-expanded beads 76 are contained within closing profile 72 forming an in-situ foam core 78. Closing profile 72 and in-situ foam core 78 form a structural article. The structural article is cured in a curing die 80 where heat is optionally applied by at least one heater 82. The structural article is cross cut to length at a point at or beyond a puller (not shown) which is pulling fiberglass rovings 60 along the axis of the process.

It is understood that placing pre-expanded beads into closing profile 72, or any configuration having cross-woven reinforcements may require that placing of the pre-expanded beads 20 from bead dispenser 24 may be a discontinuous dispensing operation in order to avoid the cross-woven reinforcement. Bead dispenser 24 may include a reciprocating dispensing component which is configured to avoid the cross-woven reinforcement upon receiving a signal from a sensor such as an optical sensor, a proximity sensor, or a time sensor.

In at least one embodiment, resin in resin bath 64 includes a thermoset polymer composition. Non-limiting examples of thermoset polymer composition include a polyester composition, a vinyl ester composition, an epoxy composition, and a phenolic composition.

It is understood that while fiberglass rovings are illustrated, other reinforcements such as stitched rovings, aramid fibers, polyester fibers, carbon fibers, carbon fiber nanotubes fibers are contemplated within the scope and spirit of the embodiments. It is also understood that while rovings are illustrated, a reinforcement tow may be used.

In certain embodiments of extrusion or pultrusion processes herein, other materials may be included in the compositions used for the profiles. Non-limiting examples of other materials include a filler, a catalyst, an initiator, an ultraviolet light inhibitor, an additive, an adjuvant, and a release agent.

In at least one embodiment, in extrusion system 98 extrudes structural plastic articles, as schematically illustrated in FIGS. 4A and 4B. Extrusion system 98 includes an extruder 100, a spider 102 connected to a mold 104 by a connector 106 and a second connector 108. Extruder 100 extrudes a molten plastic arm 110 is separated from a second molten plastic arm 112, Molten passes about spider 102 until forming a profile 114 proximate to the entrance to mold 104. Molten arms 110 and 112 defining a cavity 116 into which a dispenser 118 and a steam pin 120 are placed in a co-linear configuration relative to a longitudinal axis 122 of extruder 100. Bead dispenser 118 and steam pin 120 pass through the spider 102 in a cavity 124 defined by the spider 102 walls. Bead dispenser 118 and steam pin 120 further pass through a cavity 126 defined by mold 104 walls. Steam pin 120 extends further into cavity 126 of mold 124 than bead dispenser 118.

Bead dispenser 118 transfers pre-expanded beads 128 from a bead source (not shown) proximate to extruder 100. During the pressurization accompanying transfer of pre-expanded beads 128, the pre-expanded beads 128 are compressed in the range of 10 volume percent to 70 volume percent in at least one embodiment. In another embodiment, pre-expanded beads 128 are compressed in the range of 25 volume percent to 50 volume percent. The compressed pre-expanded beads 128 are dispensed into cavity 126 of mold 104 and continue to travel downstream from the extruder 100. Upon dispensing, the compressed pre-expanded beads 128 re-expand to approximately the size of the original pre-expanded beads 128. Steam 130 from steam pin 120 is continuously provided to cavity 126 of mold 104 causing the re-expanded, pre-expanded beads 128 to expand fully forming fully expanded beads 132 comprising in-situ foam core 134.

In at least one embodiment, bead dispenser 118 and steam pin 120 are separate elements of extrusion system 98 and are co-linear with the longitudinal axis 122 of extruder 100. In another embodiment, steam pin 120 is concentrically displaced inside bead dispenser 118. Steam pin 120 may include telescoping segments, in at least one embodiment. In another embodiment, steam pin 120 has apertures (not shown) in steam pin 120 shaft, whether telescoping or not, in order to distribute steam broadly while minimizing the amount of separate steam pins 120.

In at least one embodiment, steam pin 120 and spider 102 are comprised of insulative material capable of preventing melting and/or premature expansion of pre-expanded beads 128. In another embodiment, steam pin 120 and spider 102 have insulative coatings applied to surfaces exposed to pre-expanded beads 128.

Spider 102 has a shape configured have molten plastic arms 110 and 112 shaped to approximately the profile shape of mold 104 by the time molten plastic arms 110 and 112 pass the downstream end of spider 102. Spider 102, in certain embodiments, is configured to maintain constant pressure drop between the zone having maximum spider 102 width and the downstream end of spider 102. In another embodiment, spider 102 is configured to maintain a pressure drop in a range of −10 relative percent to +10 relative percent of the average pressure drop from the widest point of spider 102 to the downstream end of spider 102.

I claim:

1. A method of manufacturing an elongated article, the method comprising the steps of:

extruding a first layer plastic resin having a periphery which forms at least a portion of a wall of an elongate member having a hollow internal cavity;

dispensing a plurality of heat expandable particles into a fill region of the hollow internal cavity while the elongate member is still connected to an extruder and moving along an extrusion axis;

expanding the particles with a heated expansion fluid which is introduced into an expansion region of the cavity while the elongate member moves downstream of the fill region to form an in-situ foam core which is thermally bonded to the wall of the elongate member; and supporting the moving elongate member while the in-situ foam core cools to form the elongate article.

2. The method of claim 1 wherein the plastic resin is a thermoplastic.

3. The method of claim 1 wherein the extruded elongate member is initially extruded as an open channel, the method further comprising shaping the open channel into a tube having a continuous peripheral wall.

4. The method of claim 1 wherein the plurality of particles comprise pre-expanded thermoplastic beads.

5. The method of claim 4 wherein a heated expansion fluid comprises steam.

6. The method of claim 1 wherein the plastic resin is a thermoset polymer.

7. The method of claim 1 further comprising:

extruding a second layer plastic resin having a periphery which forms at least a portion of the wall of an elongate member; and joining the first and second layers to form the elongate member having a hollow internal cavity.

8. The method of claim 7 wherein the plurality of particles comprise pre-expanded thermoplastic beads.

9. The method of claim 8 wherein a heated expansion fluid comprises steam.

10. The method of claim 9 wherein the plastic resin is a thermoplastic polymer of similar composition to the thermoplastic beads.

11. The method of claim 1 wherein the plastic resin is a thermoplastic polymer of similar composition to the thermoplastic beads rendering the elongate article recyclable.

12. The method of claim 11 wherein the plastic resin and the thermoplastic beads are polypropylene.

13. The method of claim 11 wherein the plastic resin and the thermoplastic beads are polyethylene.

14. The method of claim 1 further comprising cutting the elongate member to length as the elongate member is moving along the extrusion axis.

* * * * *